US011890768B2

(12) United States Patent
Hodge et al.

(10) Patent No.: US 11,890,768 B2
(45) Date of Patent: Feb. 6, 2024

(54) FEEDING OF PRODUCTS IN FOOD SLICERS

(71) Applicant: THURNE-MIDDLEBY LTD, Norwich (GB)

(72) Inventors: Anthony Hodge, Norwich (GB); James Wakefield, Norwich (GB)

(73) Assignee: THURNE-MIDDLEBY LTD, Norwich (GB)

( * ) Notice: Subject to any disclaimer, the term of this patent is extended or adjusted under 35 U.S.C. 154(b) by 147 days.

(21) Appl. No.: 17/605,450

(22) PCT Filed: Apr. 28, 2020

(86) PCT No.: PCT/GB2020/051034
§ 371 (c)(1),
(2) Date: Oct. 21, 2021

(87) PCT Pub. No.: WO2020/225530
PCT Pub. Date: Nov. 12, 2020

(65) Prior Publication Data
US 2022/0193943 A1 Jun. 23, 2022

(30) Foreign Application Priority Data
May 3, 2019 (GB) ...................................... 1906226

(51) Int. Cl.
*B26D 7/06* (2006.01)
*B26D 7/01* (2006.01)

(52) U.S. Cl.
CPC ......... *B26D 7/0633* (2013.01); *B26D 7/0683* (2013.01); *B26D 2007/011* (2013.01); *B26D 2210/02* (2013.01)

(58) Field of Classification Search
CPC ............. B26D 2210/02; B26D 7/0633; B26D 7/0608; B26D 7/0683; B26D 2007/011
See application file for complete search history.

(56) References Cited

U.S. PATENT DOCUMENTS

2015/0321371 A1 11/2015 Mueller

FOREIGN PATENT DOCUMENTS

DE 4032793 4/1992
DE 19525742 1/1997
(Continued)

OTHER PUBLICATIONS

CSL, "CLS 15000—Continuous Slicer," accessed on-line at: http://www.cheesesystems.com/product/continuous+slicer, publicly available at least as earl as Mar. 3, 2019.
(Continued)

*Primary Examiner* — Jennifer S Matthews
(74) *Attorney, Agent, or Firm* — Barnes & Thornburg LLP

(57) ABSTRACT

A food processing machine (10) and a method of cutting slices or portions from a food product (60) in a food processing machine are described. The food processing machine comprises an end gripper (40) for gripping a trailing end (62) of a food product travelling along a food product flow path towards the cutter. A gripper drive assembly (41) is arranged to move the end gripper from stowed position below the food product flow path to a raised position in the food product flow path after a food product has passed over the end gripper and then bring the end gripper into engagement with the trailing end of the food product.

24 Claims, 10 Drawing Sheets

(56) References Cited

FOREIGN PATENT DOCUMENTS

| | | | | |
|---|---|---|---|---|
| DE | 20218439 U1 | 1/2003 | | |
| DE | 102014106353 | 11/2015 | | |
| DE | 202016102386 | 5/2016 | | |
| DE | 202016102386 U1 * | 6/2016 | | |
| EP | 1704971 | 9/2006 | | |
| EP | 1704973 | 9/2006 | | |
| SU | 581035 | 11/1977 | | |
| WO | 2011/080787 | 7/2011 | | |
| WO | WO-2013164143 A2 * | 11/2013 | ............. | B26D 7/025 |
| WO | WO-2020007642 A1 * | 1/2020 | ........... | B26D 7/0633 |

OTHER PUBLICATIONS

Search Report issued in Appl. No. GB1906226.4 (2019).

Search Report & Written Opinion issued in Appl. No. PCT/GB2020/051034 (2020).

Notification of Grant issued in Appl. No. GB1906226.4 (dated Aug. 9, 2022).

* cited by examiner

FEEDING OF PRODUCTS IN FOOD SLICERS

CROSS-REFERENCE TO RELATED APPLICATIONS

This application is a United States nationalization application of PCT Application No. PCT/GB2020/051034, filed on Apr. 28, 2020, which claimed priority from United Kingdom Application No. GB 1906226.4, filed on May 3, 2019, the entirety of each are hereby fully incorporated by reference herein.

FIELD OF THE INVENTION

The present invention relates to a food processing machine and a method of cutting slices or portions from a food product in a food processing machine and more particularly to the feeding of a food product towards the cutter of such a machine.

BACKGROUND TO THE INVENTION

It is known to feed food products such as bacon, cheese or cooked meat towards a cutting region in a food processing machine using feed conveyors or toothed rollers. The food product, which may be in the form of a loaf, log or block for example, is fed incrementally towards the cutting region, where slices or portions of a desired size are cut from a leading end of the food product.

SUMMARY OF THE INVENTION

The present invention provides a food processing machine comprising:

a cutter for cutting portions from a leading end of a food product;

an end gripper for gripping a trailing end of a food product travelling along a food product flow path towards the cutter; and a gripper drive assembly for driving the end gripper, wherein the gripper drive assembly is arranged to move the end gripper from a stowed position below the food product flow path to a raised position in the food product flow path after a food product has passed over the end gripper and then bring the end gripper into engagement with the trailing end of the food product.

The food processing machine may include a food product drive assembly for driving a food product along the food product flow path towards the cutter for use in combination with the end gripper. With many food products, it is not possible for the food processing machine to cut acceptable slices or portions from the whole of the food product, through to and including its trailing end. For example, the shape of the trailing end may vary from product to product, particularly in the case of naturally formed products rather than processed foods. Cutting of the whole of such products is likely to generate unacceptable slices or portions from the trailing end and may generate unwanted debris within the machine or on an outflow conveyor of the machine. To address this, as described herein, an end gripper is used to grip the trailing end of a food product. It may therefore be used to control the trailing end of the food product as it travels through to the cutter. The end gripper may retain the end portion of a food product to prevent it from moving past the cutter. This end portion is referred to herein as a "butt end".

The gripper drive assembly is operable to bring the end gripper into engagement with the trailing end of the food product to grip the trailing end. As the trailing end approaches the cutter, the size of the remaining portion of the food product reduces and so the remaining portion can become relatively unstable, making it more difficult to accurately control its position within the machine. This can lead to inaccuracy in the size of the slices or portions cut from the food product as the trailing end approaches the cutter. This therefore reduces the yield of acceptable slices or portions from a food product. An end gripper may be deployed as described herein to give greater control over the location of the trailing end of the food product as it nears the cutter, enabling a greater number of acceptable slices or portions to be cut from the food product and thereby increase the yield from the food product.

As the gripper drive assembly is arranged to move the end gripper from a stowed position below the food product flow path to a raised position in the food product flow path, the distance travelled by the end gripper to move between the two positions can be minimised, as the distance of the stowed position from the food product flow path can be independent of the dimensions of the food product. Furthermore, since the stowed position is outside the food product flow path, the gripper does not need to be retracted away from the cutter for the full length of a food product before the next product can be fed towards the cutter. This serves to reduce the time taken to load the next food product to be cut.

The food product flow path may be defined by support surfaces or a bed of the food processing machine. The food product flow path may be a volume through which products flow in the machine towards the cutter. The gripper drive assembly may be arranged to move the end gripper from a stowed position below the food product flow path to a raised position behind the food product in the food product flow path.

The food processing machine may have an inclined configuration in which the food product flow path is inclined at an angle relative to horizontal. It may include an inline feed configuration in which the next food product to be sliced is fed towards the cutter in line with the previous food product along the food product flow path. The inline feed may be implemented using a pivotable loading arm or a curved bed feed conveyor, for example.

Preferably, the gripper drive assembly is arranged to move the end gripper into engagement with the trailing end of the food product after cutting of the leading end of the food product by the cutter has started. As the end gripper is brought into engagement with the food product partway through the cutting of the product, the end gripper does not need to be retracted for the full length of the product prior to its engagement with the product. This serves to reduce the time taken to load each product into the machine as it is not necessary to wait for the end gripper to be retracted for the full length of the product.

The gripper drive assembly may be arranged to retract the end gripper away from the cutter as the gripper drive assembly moves the end gripper back to the stowed position. The end gripper may be arranged to release the trailing end of the food product after retraction of the end gripper away from the cutter has started. Thus, the end gripper may be employed to retain a butt end of the food product and retract it away from the cutter. The end gripper may then release the butt end enabling it to be carried away from the machine for further processing. Preferably, the end gripper is arranged to release the trailing end of the food product when the end gripper has been retracted out of the food product path. The gripper drive assembly may retract the end gripper along a path having a component which extends laterally relative to the food product path. The end gripper may be arranged to release the trailing end of the food product when the end gripper has been retracted below the food product path. Retraction of the end gripper in a downwards direction enables it to be moved quickly to a location where it can release the butt end so that it falls under gravity away from the food product flow path. The end gripper may be retracted along a path in a direction extending both downwardly and away from the cutter to reduce the time taken for the end gripper to return to its stowed position.

The end gripper may include a top surface which forms part of the support surfaces of the machine which support food products moving along the food product flow path, when the end gripper is in its stowed position. In this way, the stowed position may be located immediately adjacent to the product flow path, thereby minimising the distance over which the end gripper needs to travel to move to a deployed position and during its retraction back to the stowed position. By reducing the time taken for the end gripper to return to its stowed position, the reload time between one food product being fed to the cutter and cutting of the next product being started can be reduced.

In preferred examples, the machine may include a feeder for driving the food product towards the cutter, wherein the feeder has an operational position where it is operable to drive a food product towards the cutter, the operational position being located below the food product flow path and between the end gripper and the cutter, and the feeder is arranged to move from the operational position to a withdrawn position so as to make way for the end gripper as the end gripper is retracted away from the cutter to its stowed position below the food product flow path. In this way, the time taken for the end gripper to return to its stowed position can be reduced. Movement of the feeder to its withdrawn position may allow the length of the path travelled by the end gripper back to its stowed position as it is retracted away from the cutter to be shortened. The feeder may be pivotably mounted to enable its end further from the cutter along the food product flow path to be lowered downwards as the feeder moves towards its withdrawn position.

The machine may be arranged to detect when the end gripper comes into contact with the trailing end of the food product. Accordingly, the precision with which the end gripper is brought into engagement with the trailing end of a food product may be increased.

The end gripper may comprise teeth for gripping a trailing end of a food product, the teeth being movable between a retracted inoperative position and an extended product-gripping position, and the machine may be arranged to move the teeth from their retracted inoperative position into their extended product-gripping position when the machine detects that the end gripper has come into contact with the trailing end of a food product. As movement of the teeth into their extended product-gripping position may be controlled in response to detection that the end gripper has come into contact with the trailing end of a food product, the reliability of the gripping of the trailing end may be improved.

In a preferred example, the machine is arranged to detect when the end gripper comes into contact with the trailing end of a food product with reference to a power or current demand from a drive motor of the gripper drive assembly. As the end gripper is brought into contact with the trailing end of a food product, the resulting resistance to movement of the end gripper towards the food product may increase the current demand from a drive motor of the gripper drive assembly. The machine may be arranged to detect this change as an indication that the end gripper has come into contact with the trailing end of the food product.

Detection of contact with reference to a power or current demand from a drive motor of the gripper drive assembly may be advantageous as it may not require additional components or connectors within the end gripper for this mode of detection to be implemented. This is desirable in food handling areas where ease of cleaning is an important requirement.

Contact between the end gripper and the trailing end of a food product may be detected by comparing the power demand from a drive motor of the gripper drive assembly with a threshold power demand which is adjustable in response to user input.

In some embodiments, contact between the end gripper and the trailing end of a food product may be detected by determining when the power demand from a drive motor of the gripper drive assembly increases by more than a predetermined amount. The predetermined amount may be adjustable in response to user input.

The ability to adjust the threshold power demand or predetermined amount of power demand increase set to indicate contact enables a user to control the magnitude of the force applied by the end gripper to the food product at the point at which the end gripper is triggered to deploy its teeth. The user may therefore adjust this setting to suit different sizes and shapes of food product.

For example, it may be desirable to apply a greater force to some food products to obtain a secure grip with the teeth than others. A firmer grip on a larger food product may be obtained by applying a greater force on the food product at the time the teeth are deployed. Initially, the body of the end gripper may be brought into contact with the food product so as to exert a force on the food product prior to deployment of the teeth.

The present invention further provides a method of cutting portions from a food product in a food processing machine in which food products travel along a food product flow path towards a cutter, the method comprising the steps of:

raising an end gripper from a stowed position below a food product flow path to a raised position in the food product flow path after a food product has passed over the end gripper; and then bringing the end gripper into engagement with the trailing end of the food product.

BRIEF DESCRIPTION OF THE DRAWINGS

Embodiments of the invention will now be described by way of example, with reference to the accompanying schematic drawings, wherein.

DETAILED DESCRIPTION OF THE DRAWINGS

Figure 1:
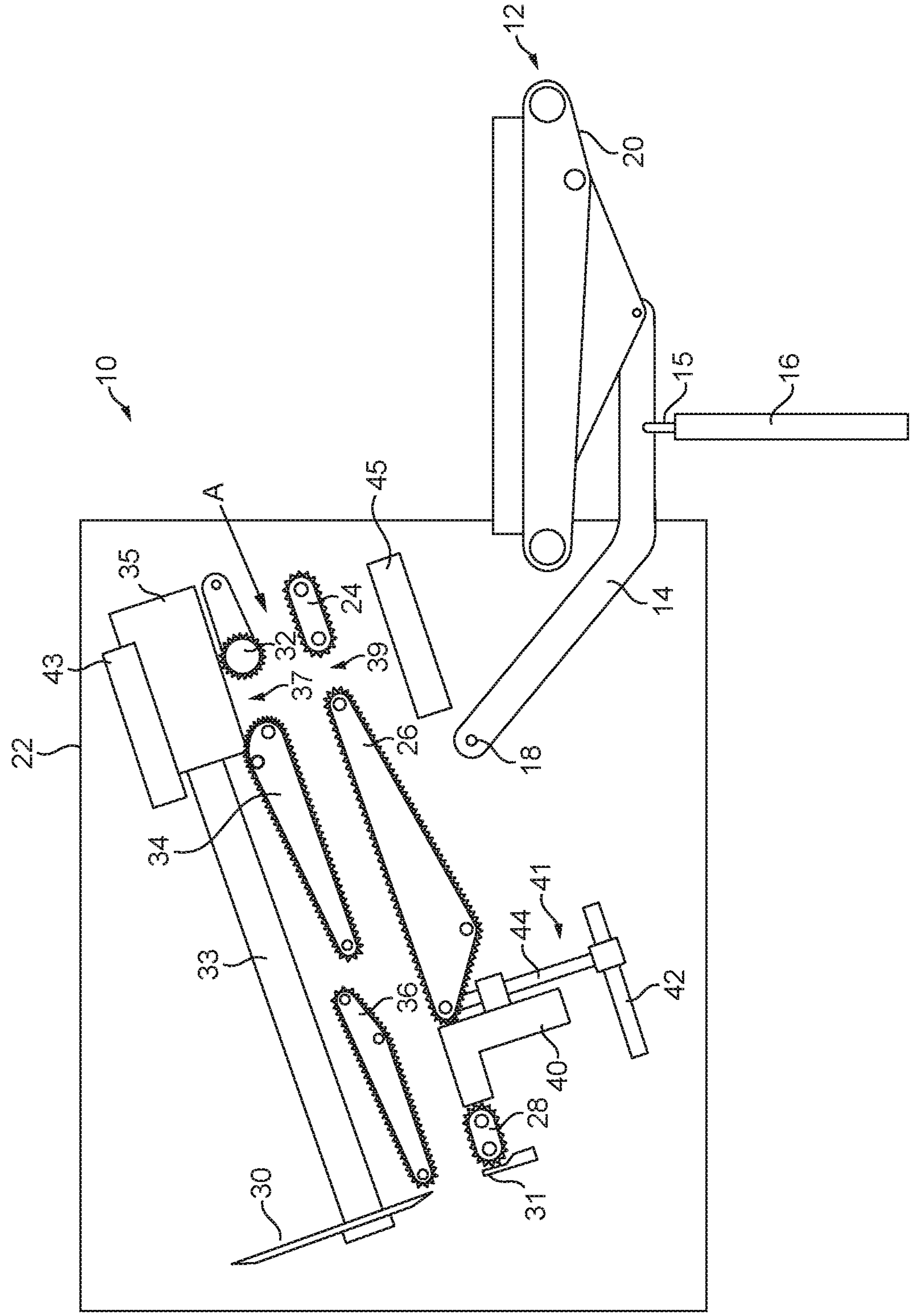
FIGS. 1 and 2 are side views of the interior of a food processing machine according to an embodiment of the invention, with its product loading arm in two different orientations.
Figure 2:
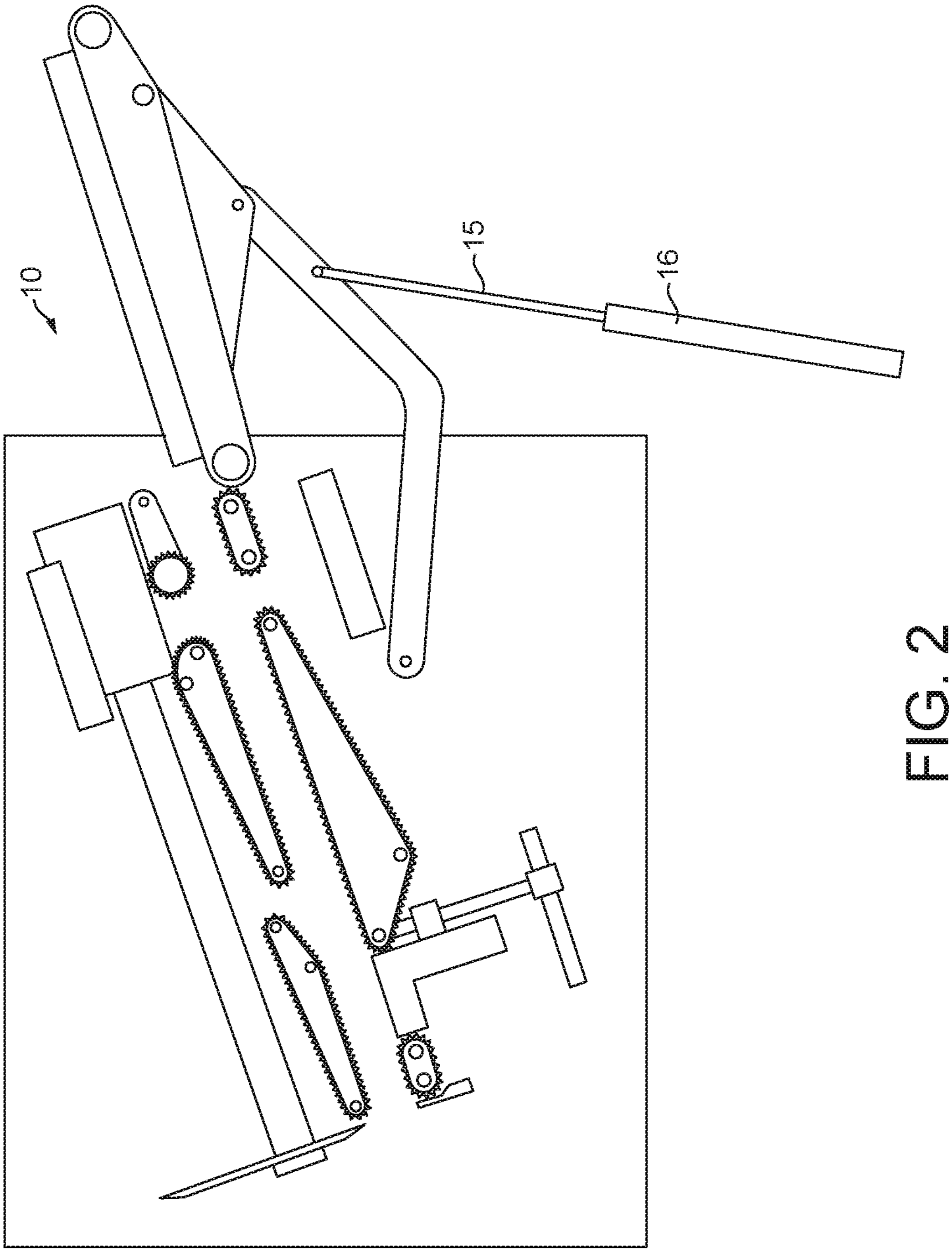

FIGS. 1 and 2 are side views of the interior of a food processing machine 10 for cutting slices or portions from elongate food products. The operation of the machine is governed by an electronic control system (not shown).

The food products are initially fed to a loading bed 12 carried by a loading arm 14. The loading bed has a horizontal orientation in FIG. 1 ready to receive the next product. The arm is coupled to a piston 15 which extends into a drive cylinder 16. The arm is rotatably mounted on a pivot 18. The arm is pivotable about pivot 18 into a raised position shown in FIG. 2 by driving the piston 15 with drive cylinder 16.

The loading bed includes a driven conveyor 20 which is operable to load a food product into the main body 22 of the machine when the loading arm is in the position shown in FIG. 2. The product is then fed in direction "A" marked in FIG. 1 along a food product flow path through the main body 22.

The food product flow path through the main body 22 is inclined at an angle relative to horizontal. The main body includes lower product feeders 24, 26 and 28 which are located below the food product flow path and operable to drive a food product towards a cutting region of the machine. In the cutting region, slices or portions are cut from the leading end of the food product by a rotatable involute blade 30. The blade is mounted on a shaft 33 which is driven by a motor 35. Upper product feeders 32, 34 and 36 are provided to engage with an upper surface of a food product to constrain it against the lower feeders as both the upper and lower feeders drive the product towards the cutting region. The blade cuts the product as it passes over a cutting edge 31.

Preferred modes of operation of the upper and lower feeders are described in a co-pending UK patent application filed on 3 May 2019 by the present applicants under UK application no. 1906230.6, and the subject matter disclosed in the UK application no. 1906230.6 is fully incorporated by reference herein.

As a food product is fed into the machine, it passes below a first gap 37 defined between upper product feeders 32 and 34 and above a second gap 39 defined between lower product feeders 24 and 26. The gaps allow the upper and lower surface profiles of the food product to be detected using upper and lower scanners 43 and 45, respectively.

The machine includes an end gripper 40. In FIGS. 1 and 2, the end gripper is shown in its stowed position below the food product flow path. The end gripper is carried by a gripper drive assembly 41 which is operable to move the end gripper relative to the main body 22 of the machine.

The gripper drive assembly includes a first pair of parallel support rods 44, which extend perpendicular to the food product flow path. The end gripper is mounted for reciprocating motion along these rods. A second pair of support rods 42 extends parallel to the food product flow path. They carry the first pair of support rods 44 and the first pair is mounted so as to be able to reciprocate back and forth along the second pair of rods.

The blade 30 and other parts of the machine are omitted in FIGS. 3 to 7 for the purposes of illustration.

Figure 3:
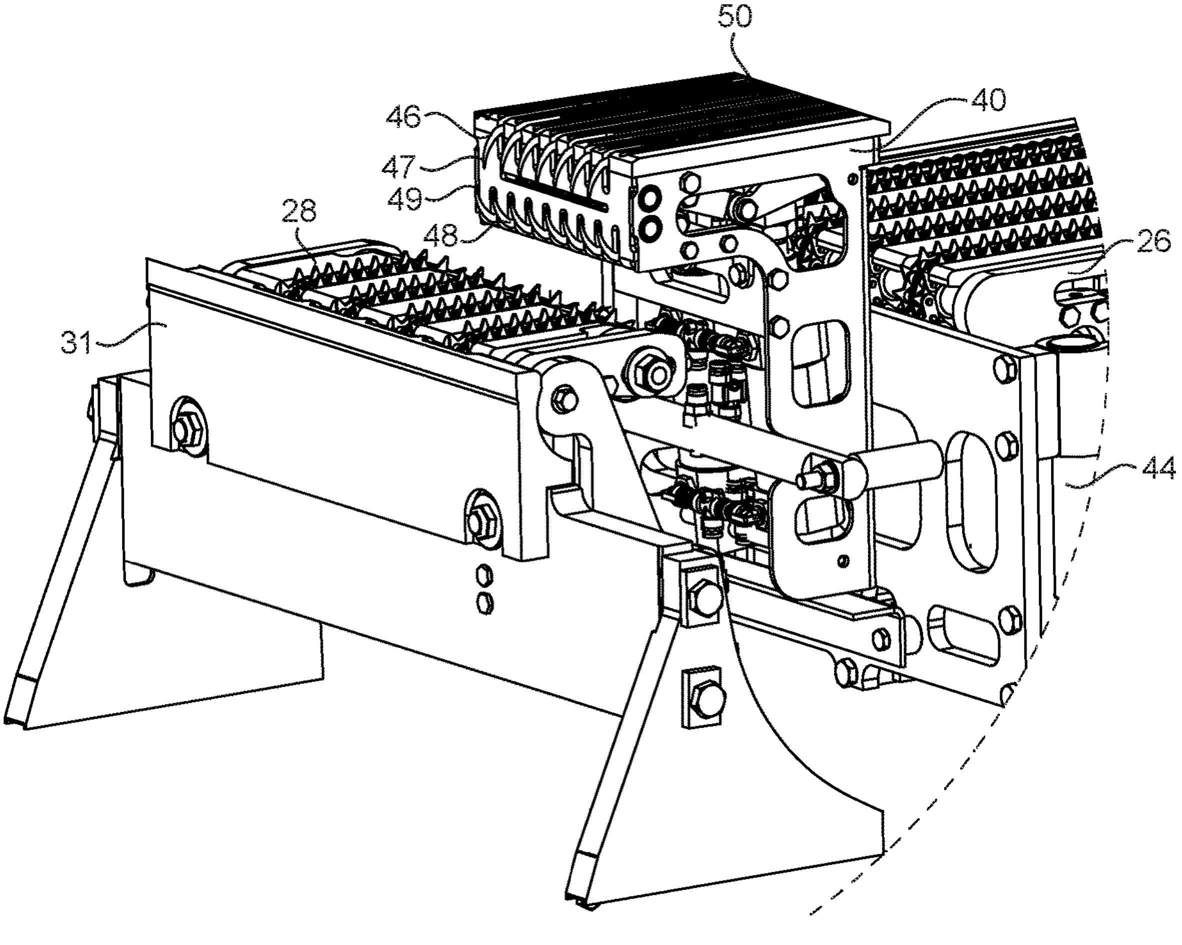
FIG. 3 is a perspective view of a region of the machine of FIGS. 1 and 2 around its end gripper.

In FIG. 3, the end gripper 40 has been moved to a raised position by the gripper drive assembly.

The end gripper includes a plurality of teeth or tines 46, 48 for gripping a trailing end of a food product. The teeth may be movable between a retracted inoperative position within the body of the end gripper and an extended product-gripping position which is shown in FIG. 3, while in other embodiments the teeth may be fixed upon the end gripper. In the example shown in FIG. 3, the end gripper includes a set of seven downwardly extending teeth 46 and a set of eight upwardly extending teeth 48 below the first set. In embodiments where the teeth move with respect to the end face of the end gripper, in the retracted position, the tips 47, 49 of the teeth are disposed within the volume of the end gripper, while in the extended position, the tips 47, 49 of the teeth extend outside of the volume of the end gripper.

It will be appreciated that other types of end gripper may be used to hold the trailing end of a food product, such as grippers employing suction or a vacuum for example.

The end gripper includes a top surface 50. When the end gripper is in its stowed position, this top surface may be co-planar with the upper surfaces of the lower product feeders 24, 26 and 28, each of which provides surfaces for supporting and driving a food product as it moves along the food product flow path.

The top surface 50 of the end gripper preferably presents a low friction and low stiction surface to facilitate smooth motion of the food product over the end gripper.

It may be formed of rigidized stainless steel or a ridged food-approved plastic material for example.

Operation of the end gripper will now be described with reference to FIGS. 4 to 7, which show successive positions of the end gripper during operation of the machine.

Figure 4:
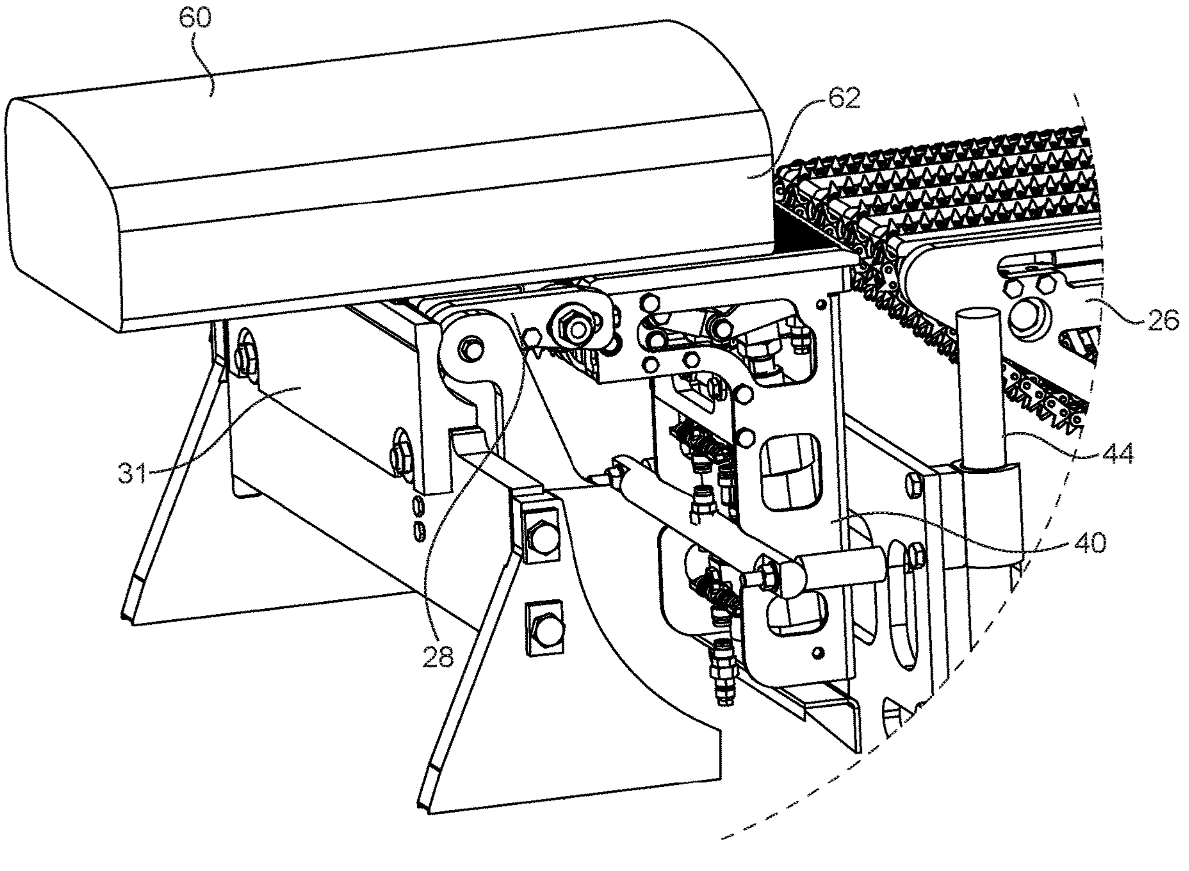
FIGS. 4 to 7 are successive perspective views of a region of the machine of FIGS. 1 and 2 showing different positions of its end gripper.

The end gripper is shown in its stowed position in FIG. 4. Its top surface 50 may be flush with the plane of the bed of the machine as defined by the adjacent feeders 26 and 28, as a food product 60 is driven along the food product flow path, or the top surface 50 may be recessed below the plane. At the stage shown in FIG. 4, the trailing end 62 of the food product 60 is disposed above the end gripper as the food product travels towards the blade.

Figure 5:
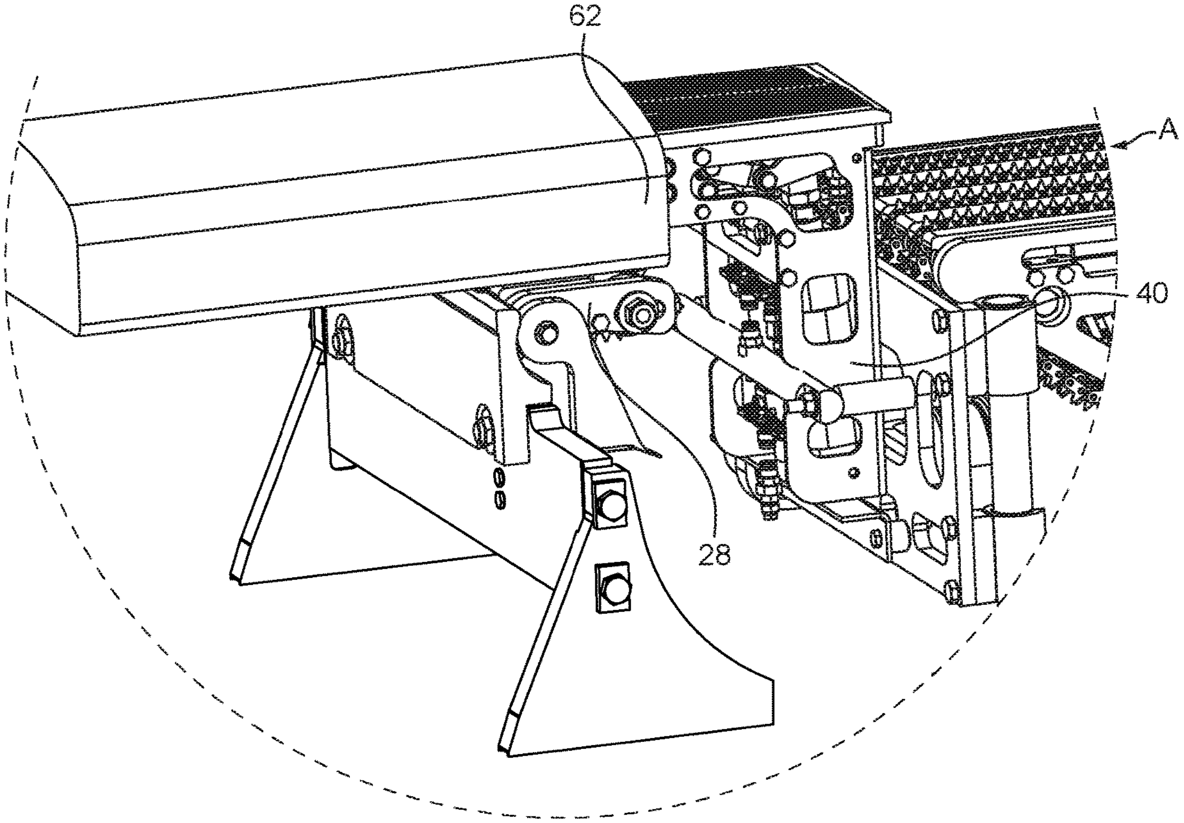
Figure 6:
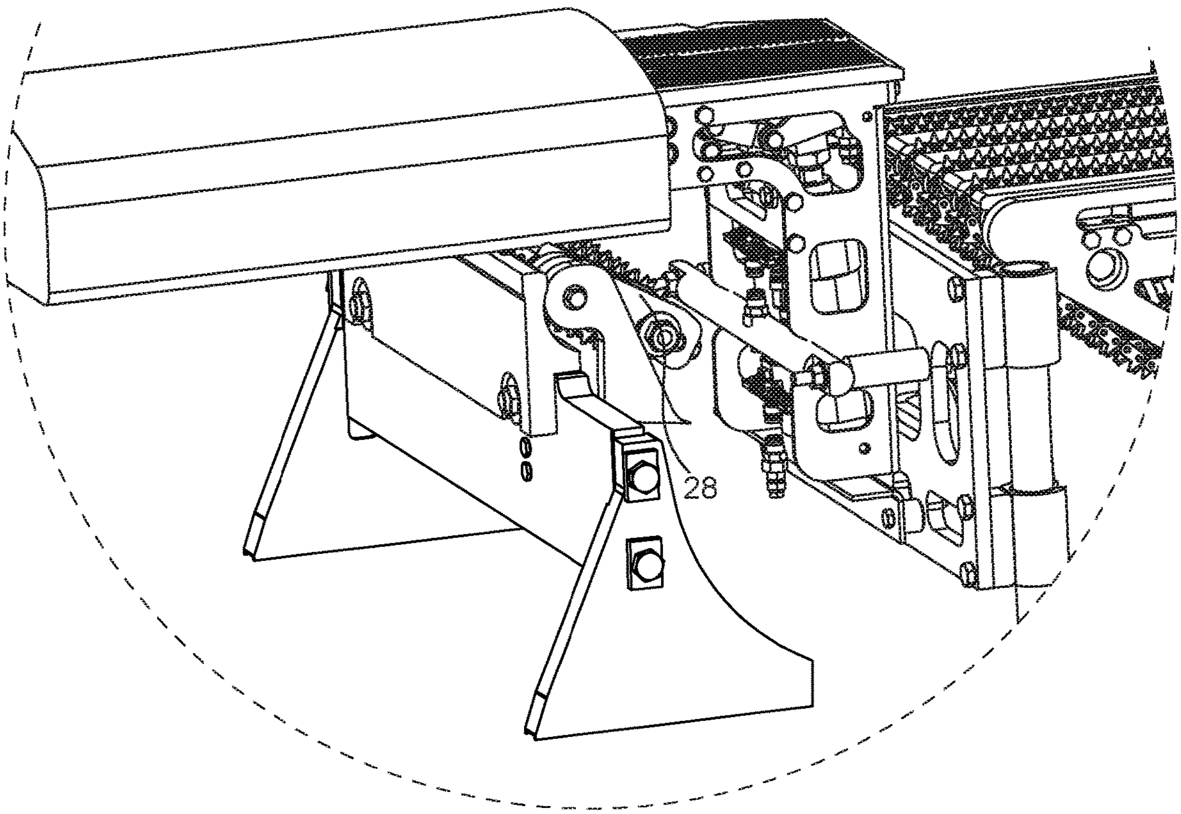
Figure 7:
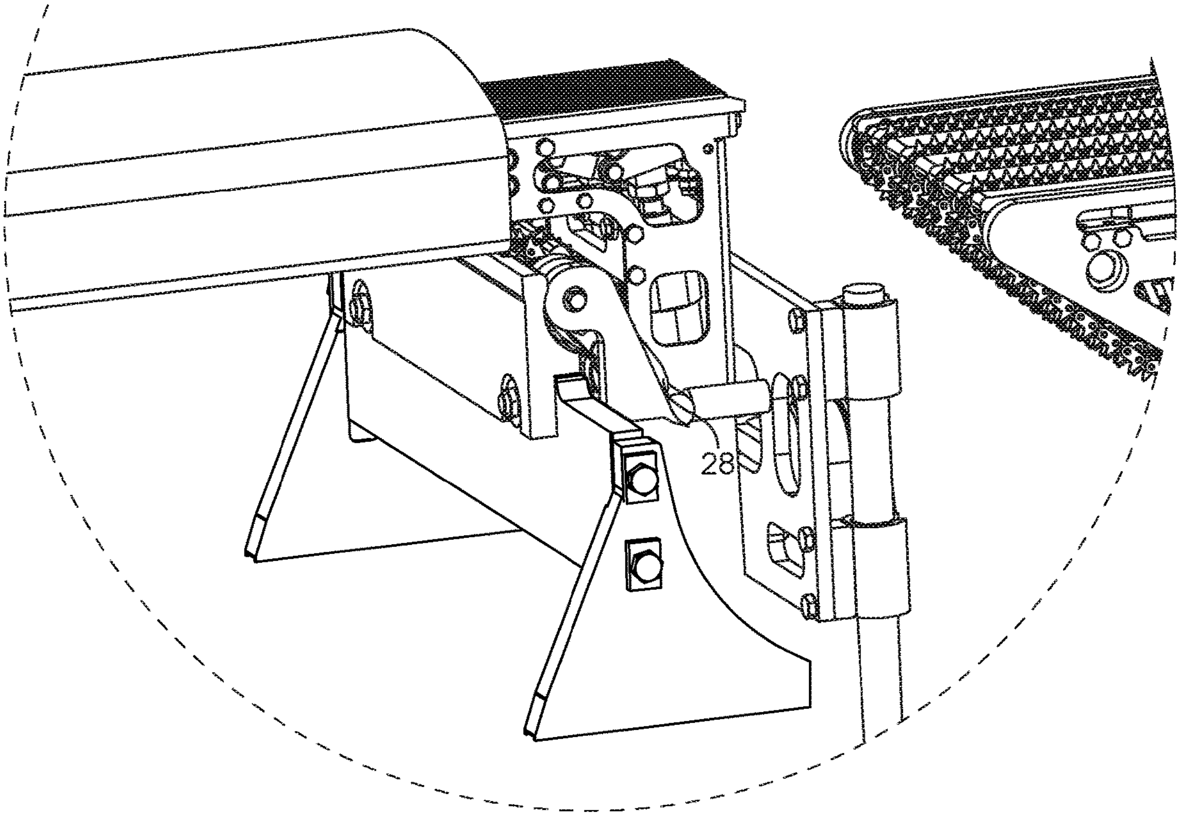

As soon as the trailing end 62 has moved beyond the end gripper, the end gripper is moved to its raised position by the gripper drive assembly. This raised position is shown in FIG. 5. The gripper drive assembly then moves the end gripper along the direction "A" behind the trailing end 62 of the food product.

The machine may be able to predict when the trailing end will move past the end gripper with reference to data obtained by pre-scanning the food product in order to obtain its dimensions. This enables the machine to control the motion of the end gripper so that it is raised immediately after the food product has passed over it.

In other embodiments, machine may be able to predict when the trailing end will move past the end gripper with reference to a counter or clock signal and the speed of movement of the food product along the product flow path. Alternatively, a portion of the food product may be marked in a manner detectable by the machine to determine the location of the food product within the machine.

Once the end gripper has been raised, it is moved or translated in the direction of the product flow, and in some embodiments, moved or translated at a speed slightly greater than that at which the food product is driven towards the blade. This brings the end gripper into contact with the trailing end. This contact will lead to some resistance to further movement of the end gripper towards the product, as the product is firmly constrained by the feeders 31 and 36 of the machine against movement relative to those feeders. This resistance may be detectable by the drive motor of the gripper drive assembly employed to drive the end gripper along rods 42. It may manifest itself in increased power or current demand by the motor. The drive motor may be a servo motor operable in a "torque mode" as it is pushed into contact with the food product. Upon detection of this increased current demand, the machine operates to move the teeth of the end gripper from their retracted inoperative position to their extended product-gripping position so as to grasp the trailing end of the product.

In further examples, contact between the end gripper and the trailing end of the product may be detected by a pneumatic or electronic switch included in the end gripper, or by an electronic sensor in the end gripper. In one approach, a sensor may be arranged to detect when one or more teeth of the end gripper are pushed inwardly due to initial contact between the end gripper and the trailing end of the food product.

In some embodiments, when the required number of slices or portions has been cut from the food product, the end gripper is retracted away from the cutting region. It is retracted in a downward and rearward direction, through the location shown in FIG. 7. At this time, the end gripper may carry a butt end of the food product (not shown in FIG. 7).

In order to reduce the time taken for the end gripper to travel back to its stowed position, lower feeder 28 is pivotably mounted in the main body of the machine. It is shown in a partially pivoted orientation in FIG. 6 and a fully pivoted orientation, in its withdrawn position, in FIG. 7. The end gripper is then able to follow a more direct, shorter path towards its stowed position, instead of reversing its travel along the product flow path and then moving downwards. At least some, or all, of the return path may be a diagonal path relative to the direction of the food product flow path.

As the end gripper returns to its stowed position, its teeth are retracted to their retracted inoperative position, thereby releasing the butt end from the end gripper. The butt end then falls into a collecting bin or on to a conveyor for further processing. As the end gripper is retracted towards a stowed position below the food product flow path, the butt end can be released soon after retraction of the end gripper has started without risk of fouling the food product flow path.

As the end gripper engages with the food product during the final stage of its cutting only, the range of travel of the end gripper along the direction of the food product flow is reduced. This, in combination with the stowed position being immediately adjacent to the flow path, means that the time taken for the end gripper to return to its stowed position ready to allow the next food product to pass over the top of it is relatively short. This allows the reload time of the machine between successive food products to be minimised.

Figure 8:
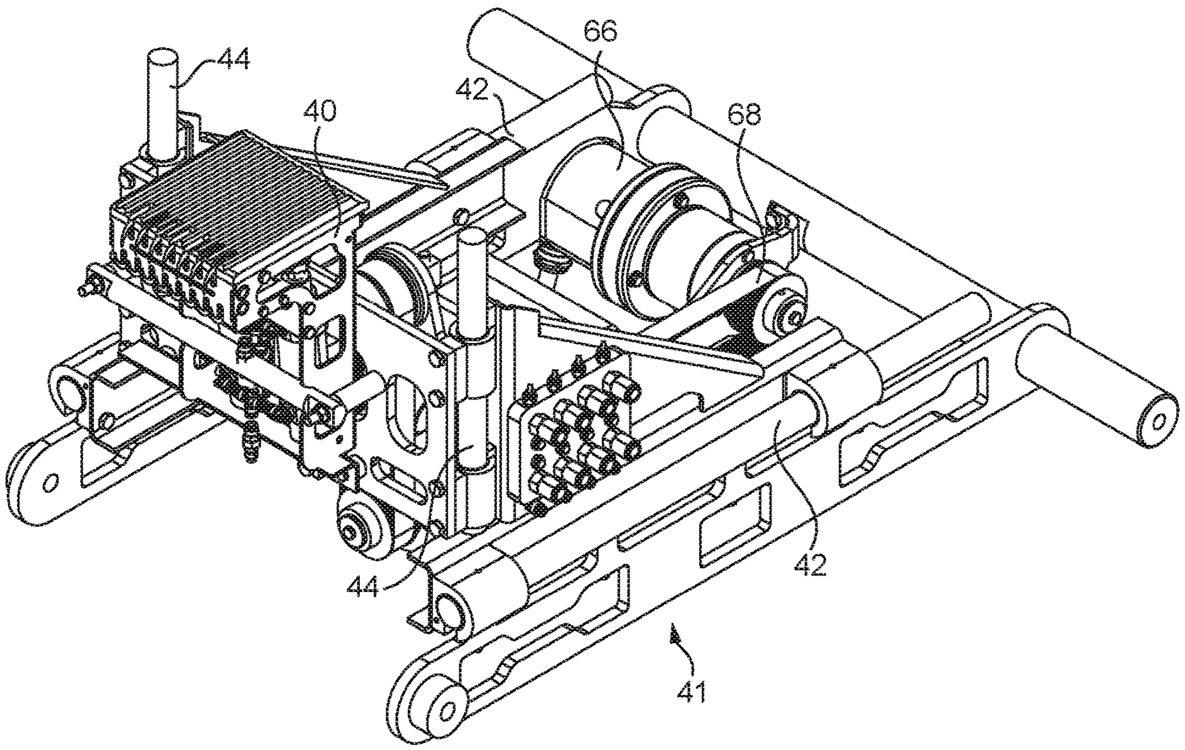
FIGS. 8 to 10 are perspective views of an end gripper together with a gripper drive assembly.
Figure 9:
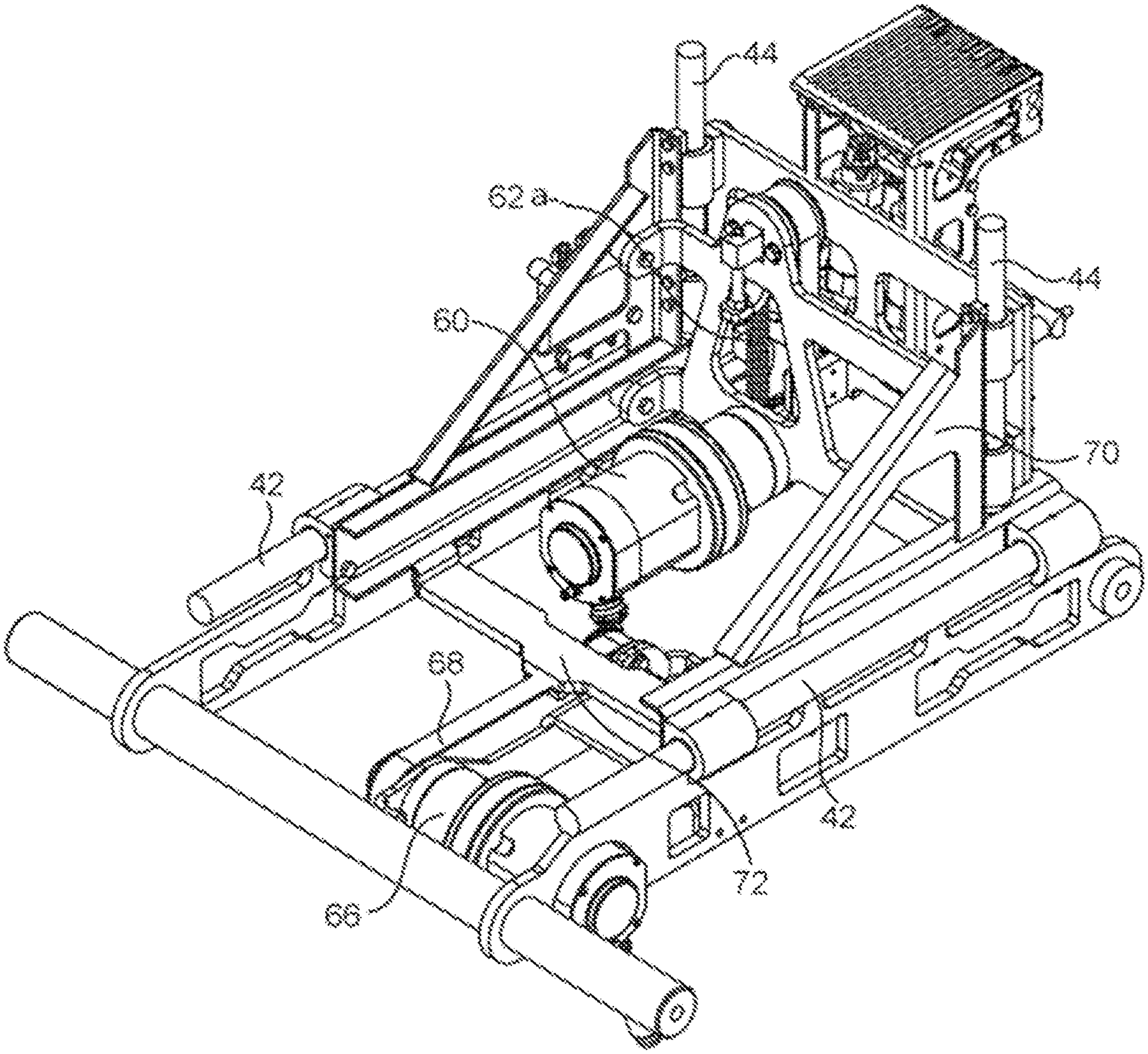
Figure 10:
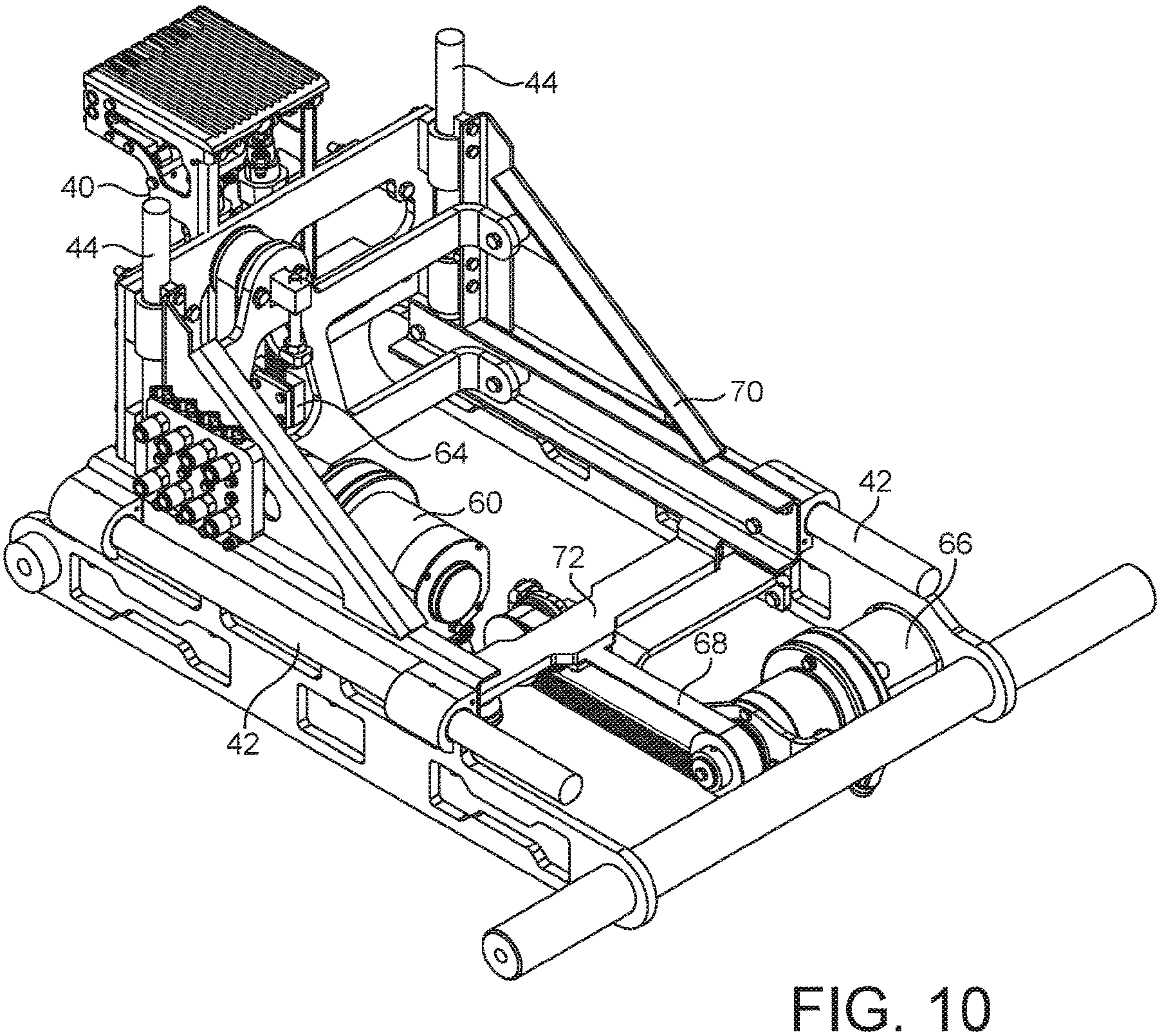

The gripper drive assembly may be arranged to move the end gripper in a vertical plane parallel to the direction of product flow "A". It may comprise two drive arrangements operable to move the end gripper along respective orthogonal linear axes. An example of a suitable gripper drive assembly is shown in more detail in FIGS. 8 to 10. The gripper is driven along the first pair of support rods 44 by a first motor 60. A first timing belt 62*a* is coupled to a drive shaft of the first motor 60. The end gripper 40 is attached to the belt 62*a* via a plate 64 which is clamped to the belt.

The end gripper is driven, together with the first pair of support rods 44, along the second pair of support rods 42 by a second motor 66. A second timing belt 68 is coupled to a drive shaft of the second motor 66. The end gripper 40 is coupled to the belt 68 via a support framework 70 which is clamped to the belt 68 at point 72.

This gripper drive assembly is able to move the end gripper along the two mutually orthogonal pairs of rods 42, 44 using the first and second motors 60, 66 either one at a time or simultaneously, so as to follow a path of the form illustrated in FIGS. 4 to 7.

In further implementations, other types of drive arrangements may be used for moving the end gripper along one or both of the orthogonal linear axes. For example, a suitable drive arrangement may comprise a rack and pinion drive, a screw drive, a linear motor drive, or a hydraulic or pneumatic drive.

The invention claimed is:

1. A food processing machine comprising:

a cutter for cutting portions from a leading end of a food product;

an end gripper for gripping a trailing end of a food product travelling along a food product flow path towards the cutter; and a gripper drive assembly for driving the end gripper, wherein the gripper drive assembly is arranged to move the end gripper from a stowed position below the food product flow path to a raised position in the food product flow path after a food product has passed over the end gripper and then bring the end gripper into engagement with the trailing end of the food product.

2. The machine of claim 1, wherein the gripper drive assembly is arranged to move the end gripper into engagement with the trailing end of the food product after cutting of the leading end of the food product by the cutter has started.

3. The machine of claim 1, wherein the gripper drive assembly is arranged to retract the end gripper away from the cutter, back to the stowed position, and the end gripper is arranged to release the trailing end of the food product after retraction of the end gripper away from the cutter has started.

4. The machine of claim 3, wherein the end gripper is arranged to release the trailing end of the food product when the end gripper has been retracted out of the food product flow path.

5. The machine of claim 4, wherein the end gripper is arranged to release the trailing end of the food product when the end gripper has been retracted below the food product flow path.

6. The machine of claim 1, wherein the end gripper includes a top surface which forms part of support surfaces of the machine which support food products moving along the food product flow path when the end gripper is in its stowed position.

7. The machine of claim 1 further comprising a feeder for driving the food product towards the cutter, wherein the feeder has an operational position where it is operable to drive a food product towards the cutter, the operational position being located below the food product flow path and between the end gripper and the cutter, and the feeder is arranged to move from the operational position to a withdrawn position so as to make way for the end gripper as the end gripper is retracted away from the cutter to its stowed position below the food product flow path.

8. The machine of claim 1, further comprising an electronic sensor that is configured to sense a power demand from a drive motor of the gripper drive assembly, wherein the machine is arranged to detect when the end gripper comes into contact with the trailing end of a food product with reference to a sensed change in power demand from the drive motor of the gripper drive assembly.

9. The machine of claim 8, wherein contact between the end gripper and the trailing end of a food product is detected by comparing the power demand from the drive motor of the gripper drive assembly with a threshold power demand, the machine further comprises an electronic control system that is in communication with the electronic sensor, the threshold power demand being saved within the electronic control system that is in communication with the electronic sensor.

10. The machine of claim 8, wherein the end gripper comprises teeth for gripping a trailing end of a food product, the teeth are movable with respect to the gripper between a retracted inoperative position and an extended product-gripping position, and the machine is arranged to move the teeth from their retracted inoperative position into their extended product-gripping position when the machine detects that the end gripper has come into contact with the trailing end of a food product.

11. The machine of claim 1, further comprising an electronic sensor that is configured to sense a current demand from a drive motor of the gripper drive assembly, wherein the machine is arranged to detect when the end gripper comes into contact with the trailing end of a food product with reference to a sensed change in current demand from a drive motor of the gripper drive assembly.

12. The machine of claim 11, wherein contact between the end gripper and the trailing end of a food product is detected by comparing the current demand from the drive motor of the gripper drive assembly with a threshold current demand which is adjustable in response to user input, the machine further comprises an electronic control system that is in communication with the electronic sensor, the threshold current demand being saved within the electronic control system that is in communication with the electronic sensor.

13. The machine of claim 11, wherein the end gripper comprises teeth for gripping a trailing end of a food product, the teeth are movable with respect to the gripper between a retracted inoperative position and an extended product-gripping position, and the machine is arranged to move the teeth from their retracted inoperative position into their extended product-gripping position when the machine detects that the end gripper has come into contact with the trailing end of a food product.

14. A method of cutting portions from a food product in a food processing machine in which food products travel along a food product flow path towards a cutter, the method comprising the steps of:

placing an end gripper in a stowed position below a food product flow path with a top surface of the end-gripper generally co-planar with upper surfaces of adjacent product feeders in the food product flow path, wherein a food product that travels along the food product flow path moves above the top surface of the end gripper when the end gripper is in the stowed position;

raising the end gripper from the stowed position to a raised position in the food product flow path after a food product has passed over the end gripper; and then bringing the end gripper into engagement with the trailing end of the food product.

15. A food processing machine comprising:

a cutter disposed in conjunction with a feeder, the cutter configured to interact with a food product disposed upon the feeder and to selectively cut through a leading end of the food product;

an end gripper movably mounted with respect to the feeder, the end gripper movable between a stowed position and a raised position for gripping a trailing end of a food product disposed upon the feeder; and a gripper drive assembly operatively connected with the end gripper, wherein movement of the gripper drive assembly causes end gripper motion between the stowed and raised positions, wherein the gripper drive assembly is arranged to move the end gripper from the stowed position, which is below the food product flow path, to the raised position, which is in the food product flow path, and wherein the gripper drive assembly urges the end gripper to the raised position after the food product has passed over the end gripper such that the end gripper when reaching the raised position engages a trailing end portion of the food product.

16. The machine of claim 15, wherein the gripper drive assembly is arranged to move the end gripper from the stowed position toward the raised position and into engagement with the trailing end portion of the food product after the cutter has begun cutting a leading end portion of the food product.

17. The machine of claim 15, wherein the gripper drive assembly is arranged to retract the end gripper away from the raised position and toward the stowed position, and the end gripper is arranged to release the engagement with the trailing end portion of the food product after the gripper drive assembly has begun retracting the end gripper from the raised position.

18. The machine of claim 17, wherein the end gripper is arranged to release the trailing end of the food product when the end gripper has been retracted away from the raised position out of the food product flow path.

19. The machine of claim 18, wherein the end gripper is arranged to release the trailing end of the food product when the end gripper has been retracted away from the raised position and below the food product flow path.

20. The machine of claim 15, wherein the end gripper includes a top surface which forms part of a support surface upon which the food product moves along the food product flow path through the machine and toward the cutter when the end gripper is in its stowed position.

21. The machine of claim 15, wherein the feeder is arranged to move the food product towards the cutter, wherein the feeder has an operational position where it is operable to drive a food product towards the cutter, the operational position being located below the food product flow path and between the end gripper and the cutter, and the feeder is arranged to withdraw from the operational position to a withdrawn position so as to make way for the end gripper as the end gripper is retracted away from the cutter to its stowed position below the food product flow path.

22. The machine of claim 15, further comprising an electronic sensor that is configured to sense a power demand from a drive motor of the gripper drive assembly, and further comprises an electronic control system that is in communication with the electronic sensor, wherein the electronic control system is arranged to detect when the end gripper comes into contact with the trailing end of a food product, the gripper drive assembly is at least partially moved by a motor, the electronic sensor monitors the power demand of the motor during movement of the end gripper, and wherein an increase in the monitored power demand of the motor is understood by the electronic control system to be a result of the end gripper contacting the trailing end portion of the food product.

23. The machine of claim 22, wherein contact between the end gripper and the trailing end of a food product is detected by comparing the monitored power demand with a threshold power demand, the machine further comprises an electronic control system that is in communication with the electronic sensor, the threshold power demand being saved within the electronic control system that is in communication with the electronic sensor.

24. The machine of claim 22, wherein the end gripper comprises plurality of teeth, the plurality of teeth are movable with respect to the gripper between a retracted position and an extended product-gripping position, wherein each of the plurality of teeth include tips that are disposed within a volume of the end gripper when in the retracted position, and wherein the tips extend outside of the volume of the end gripper when in the extended product-gripping position, wherein the machine is arranged to move the plurality of teeth from the retracted position into the extended product-gripping position when the machine detects that the end gripper contacts the trailing end portion of the food product.

* * * * *